United States Patent
Brown et al.

(10) Patent No.: US 7,130,405 B2
(45) Date of Patent: Oct. 31, 2006

(54) IDENTIFYING A CALL MADE OR RECEIVED ON BEHALF OF ANOTHER

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 10/022,158

(22) Filed: Dec. 17, 2001

(65) Prior Publication Data

US 2003/0112951 A1    Jun. 19, 2003

(51) Int. Cl.
*H04M 3/42* (2006.01)

(52) U.S. Cl. .................... 379/210.02; 379/214.01; 379/201.07; 379/201.08

(58) Field of Classification Search ........... 379/210.02, 379/214.01, 201.07, 201.08, 213.01
See application file for complete search history.

(56) References Cited

U.S. PATENT DOCUMENTS

| | | | | |
|---|---|---|---|---|
| 5,329,578 A | * | 7/1994 | Brennan et al. | 379/211.03 |
| 5,497,414 A | * | 3/1996 | Bartholomew | 379/142.02 |
| 5,499,288 A | | 3/1996 | Hunt et al. | 379/88.02 |
| 5,511,112 A | * | 4/1996 | Szlam | 379/266.06 |
| 5,652,789 A | * | 7/1997 | Miner et al. | 379/201.01 |
| 5,673,404 A | | 9/1997 | Cousins et al. | 345/809 |
| 5,790,637 A | | 8/1998 | Johnson et al. | 379/88.04 |
| 5,901,209 A | * | 5/1999 | Tannenbaum et al. | 379/142.09 |
| 5,915,001 A | | 6/1999 | Uppaluru | 379/88.22 |
| 5,940,476 A | | 8/1999 | Morganstein et al. | 379/88.02 |
| 5,946,654 A | | 8/1999 | Newman et al. | 704/246 |
| 6,038,305 A | | 3/2000 | McAllister et al. | 379/201.02 |
| 6,058,364 A | | 5/2000 | Goldberg et al. | 701/55 |
| 6,101,242 A | | 8/2000 | McAllister et al. | 379/88.02 |
| 2002/0118807 A1 | | 8/2002 | Pedersen | 379/142.01 |

FOREIGN PATENT DOCUMENTS

| | | |
|---|---|---|
| EP | 0585004 A2 | 3/1994 |
| EP | 0676882 A2 | 10/1995 |
| JP | 8139797 A | 5/1996 |
| JP | 10294784 A | 11/1998 |

OTHER PUBLICATIONS

WPAT Derwent 1994-067503.
WPAT Derwent 1995-346415.
WPAT Derwent 1996-315499.
WPAT Derwent 1999-031530.

* cited by examiner

*Primary Examiner*—Quynh H. Nguyen
(74) *Attorney, Agent, or Firm*—H. Artoush Ohanian; Justin Dillon; Biggers & Ohanian, LLP

(57) ABSTRACT

A system, system, and program for identifying a call made or received on behalf of another are provided. In particular, a call request for a call is detected. A context for the call is requested from a context inference service, wherein the context indicates whether an on behalf of action is invoked for the call by the caller or callee. An on behalf of action may be requested by a caller or callee, automatically authorized by the on behalf of party, or inferred from other call context.

17 Claims, 6 Drawing Sheets

IDENTIFYING A CALL MADE OR RECEIVED ON BEHALF OF ANOTHER

CROSS-REFERENCE TO RELATED APPLICATIONS

The present application is related to the following co-pending applications:
(1) U.S. patent application Ser. No. 10/015,381;
(2) U.S. patent application Ser. No. 10/015,281;
(3) U.S. patent application Ser. No. 10/015,265;
(4) U.S. patent application Ser. No. 10/015,267;
(5) U.S. patent application Ser. No. 10/015,282;
(6) U.S. patent application Ser. No. 10/015,280;
(7) U.S. patent application Ser. No. 10/022,160;
(8) U.S. patent application Ser. No. 10/022,161;
(9) U.S. patent application Ser. No. 10/022,624;
(10) U.S. patent application Ser. No. 10/022,164; and
(11) U.S. patent application Ser. No. 10/022,163;

BACKGROUND OF THE INVENTION

1. Technical Field

The present invention relates in general to telecommunications and, in particular, to voice identification. Still more particularly, the present invention relates to identifying a call placed or received on behalf of another.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. A service, often referred to as Acaller ID@, provides the party receiving a call with the line number and name of the subscriber of the line number placing the call.

One limitation of caller ID is that the identity of the party actually making the call is not received, just the name of the line subscriber. For example, in a private network, if AJoe Smiths is making a call from ATom Arnold's office line@ only the extension for ATom Arnold's office line@ and an identifier for ATom Arnold@ are transferred to the called party.

Another limitation of caller ID is that the identity of the party answering the call is not returned to the party making the call. For example, in a PSTN, a single line number may be answered by multiple parties, and at multiple telephone devices.

A further limitation of caller ID is that a line number and line subscriber name provide a limited context for a call. For example, in a wireless network, where ATom Jenkins@ calls a friend's wireless number, ATom Jenkins@ does not receive any information about whether the call is wireless, how the call is being billed, and whether the wireless number is a business or personal number.

Moreover, a limitation of caller ID is that one person may make a call on behalf of another person, but because the party receiving the call does not recognize the caller ID, the party receiving the call decide not to answer. For example, if Bob's secretary calls Bob's client from her wireless telephone, Bob's client may not recognize the caller ID and will route the call to voice mail, rather than answering the phone to receive an urgent call placed on behalf of Bob.

Therefore, in view of the foregoing, it would be advantageous to provide a method, system, and program for providing the context of a call. In particular, it would be advantageous to indicate in the context whether a call is placed on behalf of another. In addition, it would be advantageous to indicate in the context whether a call is received on behalf of another.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for identifying whether a call is placed or received on behalf of another.

According to one aspect of the present invention, a call request for a call is detected. A context for the call is requested from a context inference service, wherein the context indicates whether an on behalf of action is invoked for the call by the caller and/or callee. The context, including an on behalf of indicator, is transferred to the parties to the call. An on behalf of action may be requested by a caller or callee, automatically authorized by the on behalf of party, or inferred from other call context.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
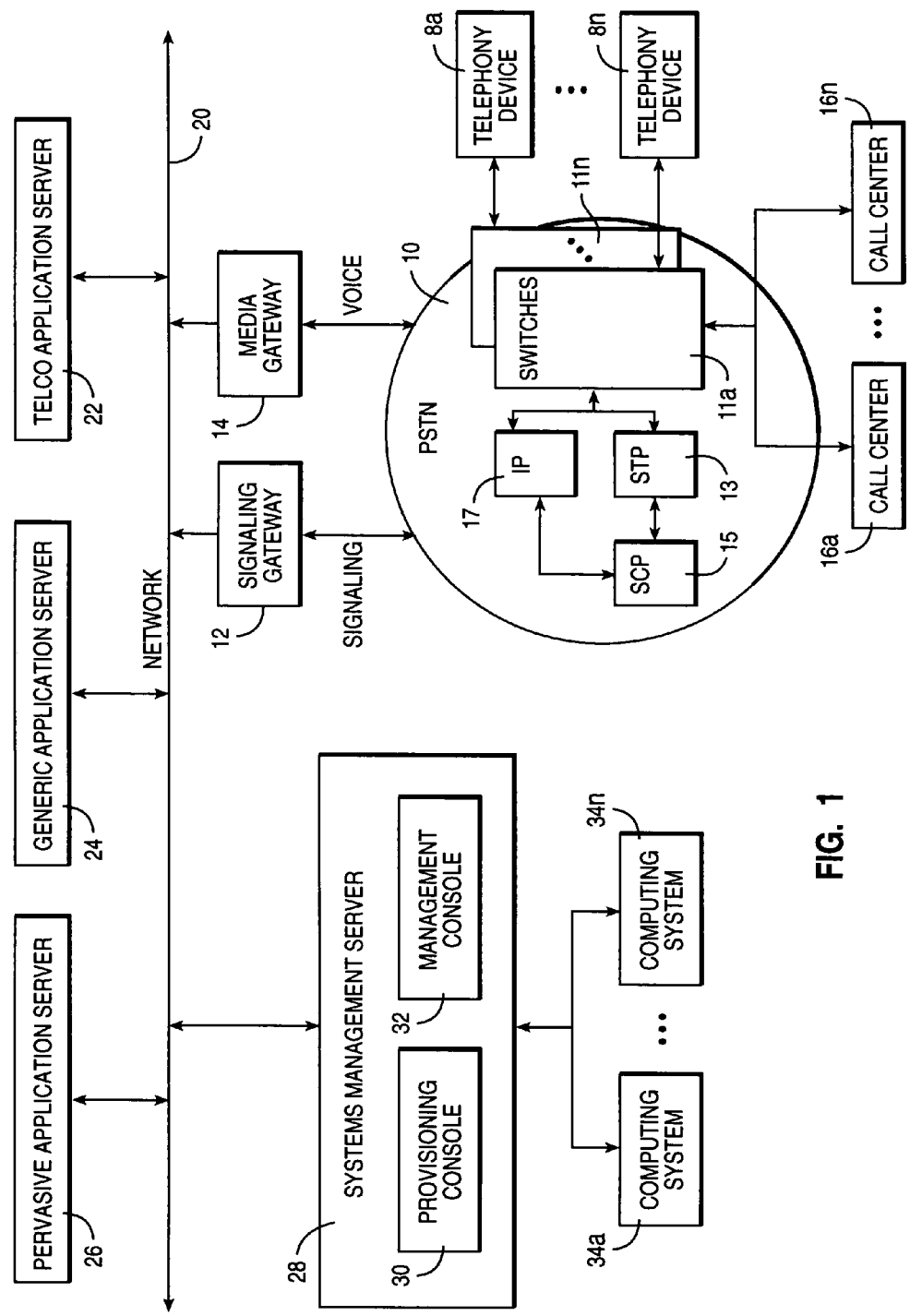
FIG. 1 depicts a block diagram of a network environment in which the present invention may be implemented.

A method, system, and program for identifying when a call is placed or received on behalf of another are provided. The context of a call may include, but is not limited to, the identity of the caller or callee, the identity of devices utilized for the call, the location of the devices utilized for the call, and a billing plan for the call. In particular, in the present invention, the identity of a caller or callee may also indicate whether the caller is placing a call on behalf of another or whether the callee is received the call on behalf of another.

A caller or callee may indicate when placing or answering a call that the action is performed on behalf of another. A context inference engine may be invoked to authenticate the action. Alternatively, the context inference engine may independently infer that a call is placed or received on behalf of another.

In particular, determining A on behalf of@ context may be performed by a context inference engine located within an Intelligent Peripheral of the trusted telephone network and/or located within a Telco Application service outside the trusted telephone network. As will be further described, the Telco application service located outside the trusted telephone network is enabled to provide services to callers and callees via enhanced security channels.

The identity of the caller and callee are preferably authenticated. In particular, identity authentication is preferably performed by authenticating the voices of the caller and callee, however other biometric input may also be utilized for identification. Identity authentication may be initiated by the origin device originating the call, the intermediary device processing the call, or the destination device receiving the call. Each of the devices may also access a third party or external server to perform the identity authentication. Performance of identity authentication has different advantages depending on the device initiating the identity authentication.

While in the present invention, authentication of a caller or callee identity is described with emphasis placed on voice authentication, other methods of caller and callee identity authentication may also be performed. Voice samples utilized for voice authentication are just one of multiple types of biometric sampling. For example, a caller or callee may locally provide an eye scan, a fingerprint, and other biophysical identifiers that are transmitted within or outside the trusted network to authenticate the identity of the caller or callee. Alternatively, keypad entries, such as a pin code, account number, password, or other secure transaction key may be entered by a caller or callee and utilized to authenticate the identity of the caller or callee.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In addition, for purposes of the present invention, a caller or callee may include an individual, a group of people, an automated service, or other party enabled to originate or receive a call. The Aon behalf of@ party may include an individual, a group of people, an automated service, or other party.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11*a*–11*n* and telco application server 22 via signaling gateway 12. In addition, a voice channel is opened between central office switches 11*a*–11*n* and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11*a*–11*n*, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11*a*–11*n* to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11*a*–11*n* if the additional caller input is verifiable for the VID.

An origin telephony device or destination telephony device may also determine a VID and/or RVID for the caller and/or callee of a call. In particular, telephony devices 8*a*–8*n* and call centers 16*a*–16*n* may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8*a*–8*n* may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8*a*–8*n*.

In addition, telephony devices 8*a*–8*n* may each incorporate a display that provides a visual output of a VID or RVID. Alternatively, such a display may be provided in a separate device connected to the line in parallel to telephones 8*a*–8*n*. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8*a*–8*n* are communicatively connected to PSTN 10 via wireline, wireless, ISDN, and other communication links. Preferably, connections to telephony devices 8*a*–8*n* provide digital transport for two-way voice grade type telephone communications and a channel transporting signaling data messages in both directions between telephony devices 8*a*–8*n* and PSTN 10.

In addition to telephony devices 8*a*–8*n*, advanced telephone systems, such as call centers 16*a*–16*n*, may be communicatively connected to PSTN 10 via wireline, wireless, ISDN and other communication links. Call centers 16*a*–16*n* may include PBX systems, hold queue systems, private network systems, and other systems that are implemented to handle distribution of calls to multiple representatives or agents.

Returning to central office switches 11*a*–11*n*, typically, one central office switch exists for each exchange or area served by the NXX digits of an NXX-XXXX (seven digit)

telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, authentication of the identity of the caller is preferably initiated in IP 17 or telco application server 22. Once a VID for a caller is received at a central office switch, a context inference service is initiated in IP 17 or telco application server 22. The context inference engine preferably requests a caller profile according to VID to determine billing information and personal information about the caller. In addition, the context inference engine preferably determines the identity of the device utilized by accessing a device directory, prompting the caller to indicate the device identity, or other methods. Further, the location of the device may be inferred from information provided by the central office switch originating the call. The context information is preferably loaded with the VID at the central office switch.

From context information retrieved and inferred, the context inference service may also determine whether a call is placed or received on behalf of another. Advantageously, where context indicates an Aon behalf of@ call, the parties to the call may be further informed of the effective parties to a call. In particular, the effective parties to a call are expanded to include the caller or callee and the Aon behalf of@ party or parties.

In addition, where context indicates an Aon behalf of@ call, billing for the call may be charged to a billing service of the Aon behalf of@ party, rather than the caller or the callee. An Aon behalf of@ party may select VIDs of callers authorized to call on behalf of the party and may select RVIDs of callees authorized to answer calls on behalf of the party.

The context information may be filtered at the central office switch according to filtering preference indicated by a caller in the caller profile. In addition, context information may be filtered according to the recipient. Context information is then transferred with the call routed by one or more central office switches to a destination central office switch that services the called party's station or line.

Then, the context information is forwarded with a caller VID to the callee telephony device. The callee is enabled to determine whether to answer a call, transfer the call to voice mail, or select from other options, based on knowing the identity of the caller and the context in which the caller is calling on behalf of another.

In addition, authentication of the identity of a callee answering the call is preferably initiated in IP 17 or telco application server 22. Once a RVID for a callee is received at a central office switch, a context inference application is initiated in IP 17 or telco application server 22 to determine the context of the callee side of a call. The callee context may indicate that the callee is answering the call on behalf of another. The callee context information is preferably filtered according to callee preferences and transferred to the caller, such that the caller is enabled to determine whether the callee is the intended recipient.

Figure 2:
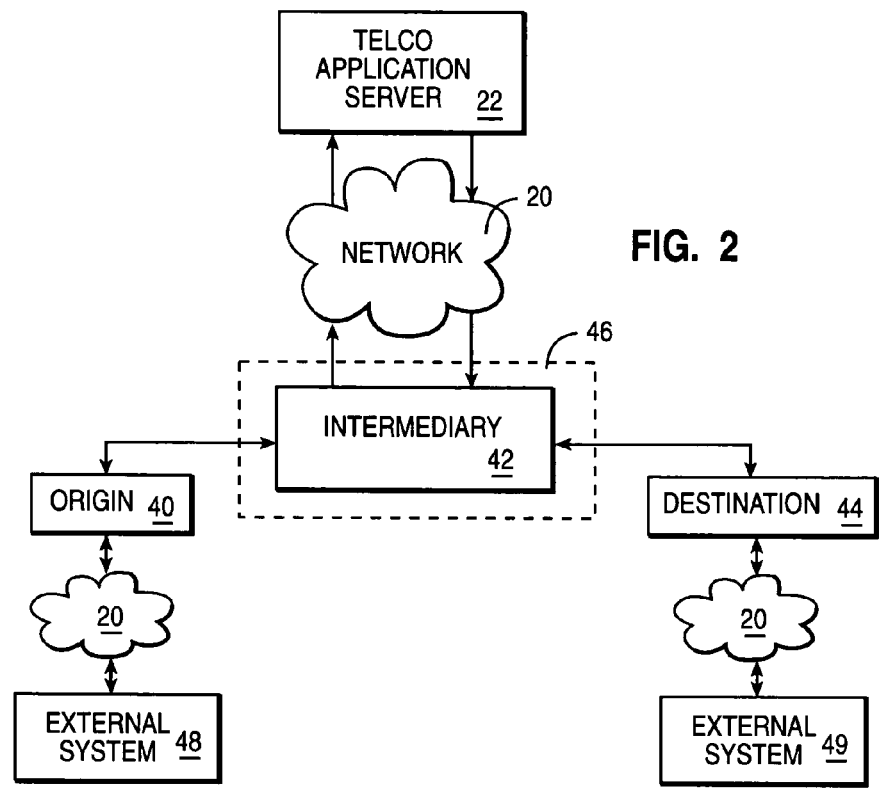
FIG. 2 illustrates a block diagram of an identity authentication and context inference system in accordance with the method, system, and program of the present invention.

Referring now to FIG. 2, there is illustrated a block diagram of an identity authentication and context inference system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes preferences, billing information, and personal information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference engines that perform context inference services. A context inference engine may utilize context information gathered from multiple databases and may gathered context information directly from a caller or callee in response to prompts.

Context may include, but is not limited to, a subject matter of a call, a device identity, the location of an origin or destination device, billing information, service subscriptions, the path of line numbers accessed in a call, and other information which may provide a caller or callee with context of a call. Information for determining the context of a call may be gathered from a caller or callee profile, from a device directory, from systems management server 28, or other databases of information.

According to the present invention, the context inference engine determines whether a call is placed on behalf of another or received of behalf of another. In one example, a caller or callee may indicate that an Aon behalf of@ action is taking place and identify the person or entity on whose behalf a call is placed or answered. Origin device 40 or destination device 44 may provide promptings to the caller or callee to indicate a subject matter of a call and whether the call is an Aon behalf of@ action. In addition, the context inference engine may prompt the caller or callee to provide such information. The context inference engine may compare the Aon behalf of@ action with other context for the call to verify that the caller or callee is authorized to perform an Aon behalf of@ action for another party and that the devices utilized indicate a call on behalf of another.

In another example, the context inference engine may analyze the context information retrieved to infer that a call includes an Aon behalf of@ action. A caller profile may indicate that a caller is a secretary, a sales person, or another professional role that requires making calls and receiving calls on behalf of another employee, another group of employees, or a business entity. In addition, where a caller profile includes a billing service of another party, it may be inferred that the caller is authorized to place calls on behalf of that party and charge the call to the party's billing service. Further, where a callee answers a call forwarded to the callee's device from another party's device, it may be inferred that the callee is answering calls on behalf of the party.

A VID or RVID, including an Aon behalf of@ action is preferably filtered according to caller or callee profile preferences. For example, a caller may select to block the Aon behalf of@ action context from callees who are not included in a selected list of RVIDs.

Figure 3:
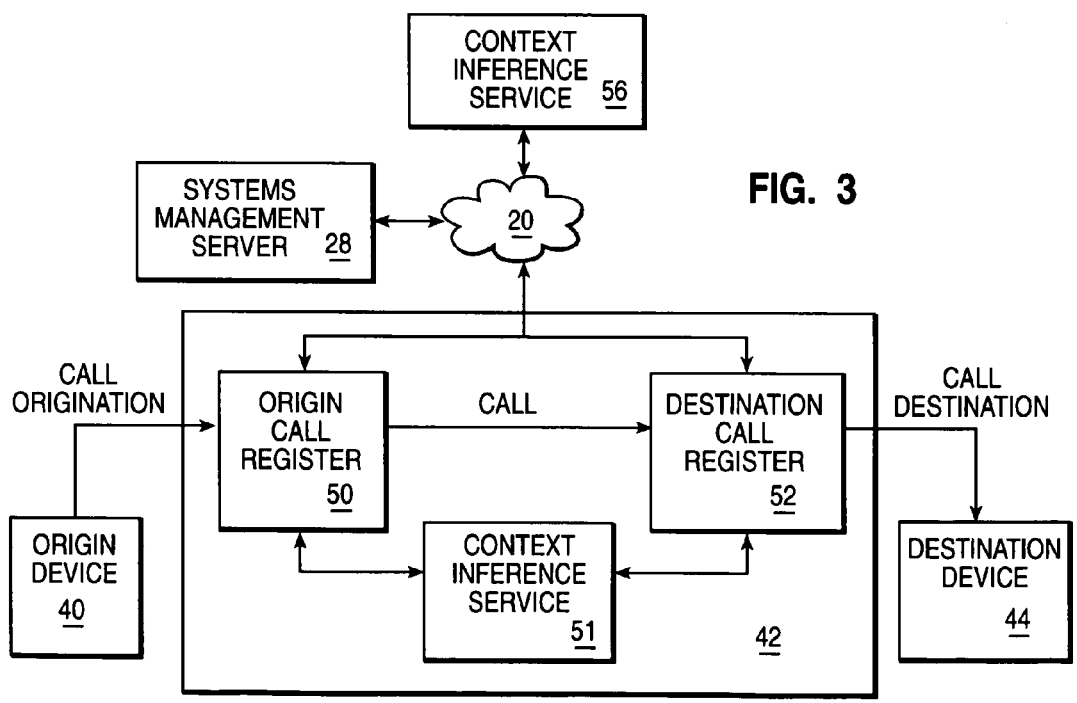
FIG. 3 depicts a block diagram of the flow of a call through a context inference system in accordance with the method, system, and program of the present invention.

A VID or RVID may be transferred in multiple protocols, including, but not limited to, Interface Definition Language (IDL). A VID or RVID may include a range of information, where each type of information may be tagged or identified in some other manner. For example, the following tagged VID may be transmitted to represent an authenticated identity of a caller and context of the call:

[name] Jon Smith
[on behalf of] Jane Doe
[device] Jane Doe's cell phone
[location] Central Time zone, Austin, Tex.
[subject] Project A
[billing] Jane Doe's service provider A
[authenticated by] Jane Doe's cell phone, service provider G With reference now to FIG. 3, there is depicted a block diagram of the flow of a call through a context inference system in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

The call is preferably transferred through a voice channel to a destination switch, in which a destination call register 52 is created to hold the call. In addition, profile and other information for the call may be transferred through a signaling channel from origin call register 50 to the destination switch and loaded into destination call register 52. The destination switch then controls termination of the call at destination device 44.

A context inference service may be initiated by the origin switching system or the destination switching system. In particular, a context inference service 51 may be located within trusted telephone network 46 within an IP. Alternatively, a context inference service 51 may be located outside trusted telephone network 46 within a telco application server accessible via network 20.

The context inference service preferably determines the context for a call including, but not limited to the identities of parties to a call, the identities of devices utilized in a call, the locations of those devices, the billing plan for a call, services subscribed to and provided by parties to a call, and the subject matter of a call.

To determine the identity of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees. Alternatively, the line subscriber profile may indicate that the line is a personal line.

Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is registered for the number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

In particular, in retrieving a caller profile according to VID, systems management server 28 may be accessed. Systems management server 28 preferably provides an interface through which an individual may adjust preferences, select services, and provide other information, which is stored and made accessible according to the individual's VID. Systems management server 28 may track services that an individual subscribes to, such as a stock subscription service. In addition, systems management server 28 allows an individual to adjust billing information and view current charges according to VID.

The VID provides the context of who is placing the call. The caller profile provides further context based on the billing information and service subscriptions of the caller. In addition to indicating who is answering the call, the role of the person answering the call may be indicated.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference engine may infer the subject matter of a call based on the caller's schedule. The context inference engine may also infer the subject matter of a call based on the caller's business or the business associated with the line number utilized by the caller.

According to an advantage of the present invention, where a business subject is determined as the context for a call, then business qualification information about the caller or the callee or Aon behalf of@ party may be accessed from the caller or callee profile and output with the context. In particular, a business bureau database may be accessed to retrieve business qualification information. Business qualification information might include, for example, licenses, certificates, awards, commendations, resume experience, and other indicators of a party's qualifications in a business area.

The call is preferably transferred through a voice channel to a destination switch, in which a destination call register 52 is created to hold the call. In addition, context for the call may be transferred through a signaling channel to the destination switch and loaded into destination call register 52.

Advantageously, the destination switch controls termination of the call at destination device 44. The context information for the call is also transferred to destination device 44, such that the callee is provided with a context for the call. The context information available in destination call register 52 may be filtered prior to transmittal to destination device 44 according to filtering preferences associated with the device, a line subscriber, or the callee. In addition, destination device 44 may filter the context displayed to a callee according to the device capabilities and preferences selected for the device.

In particular, the destination switch preference initiates at least one of context inference service 51 and context inference service 56 to determine the context of the recipient side of a call. Determining the context of the recipient side of a call may be performed in a manner similar to that described with reference to determining the context of the caller side of a call. In addition, as will be further described, context inferences may be further enhanced when caller side and recipient side context information is combined.

The line subscriber profile associated with destination device 44 may be accessed and utilized by the context inference service to determine context for the call. In addition, destination device 44 may return a device identifier to destination call register 52 or the identity of destination device 44 may be inferred from other context information. Further, the identity of the callee is preferably authenticated, such that the RVID and callee profile accessible according to RVID further enhance context information.

Context information determined for the recipient side of the call may be transferred to origin device 40 via origin call register 50. Filtering of the recipient call context may be performed according to multiple factors, including callee filtering preferences. In particular, multiple entities may receive the filtered context information, where filtering preferences may be uniquely specified for each of the multiple entities.

Additional context inferences may be inferred when caller side and recipient side context information is viewed concurrently. For example, where the caller is a subscriber to a stock service and the callee is the stock service, the subject matter of the call may be inferred to include access to the stock service. In another example, where the caller and the callee share the same last name, it may be inferred that there is a relation between the parties. In yet another example, where the caller and the callee share an address or other information, it may be inferred that the parties work at the same business address or live at the same personal address.

In addition, context may indicate the path of a call. Each line number accessed during a call is preferably captured by a switch, such as the origin switch or destination switch. In addition, where origin device 40 or destination device 44 are call centers or private switching networks, the path of the call through the call centers or private switching networks may be captured. Where a single call is transferred or forwarded to a series of people, the VIDs and RVIDs of each person or automated service answering a device are preferably included in the path of a call. Further, even where the RVID of a callee is blocked or context is blocked, the path of the call may still indicate that the call was forwarded or transferred.

According to an advantage of the present invention, context includes an indication of whether an Aon behalf of@ action is invoked for the call. A caller may place a call on behalf of another party as an Aon behalf of@ action. Also, a callee may receive a call on behalf of another party as an Aon behalf of@ action.

An Aon behalf of@ action may be invoked deliberately by a caller or callee when answering or receiving a call by speaking or entering via keypad the name of the Aon behalf of@ party. In addition, an Aon behalf of@ action may be invoked automatically where a caller or callee profile designate an authorization by an Aon behalf of@ party. Further, an Aon behalf of@ action may be invoked by inference where a caller or callee profile indicate an Aon behalf of@ party.

According to one advantage of the present invention, an Aon behalf of@ party may select callers and callees that are authorized to invoke an Aon behalf of@ action for that party. For example, a business may select employees who are authorized to call customers on behalf of the business. When an Aon behalf of@ party selects an authorized caller or callee, an Aon behalf of@ authorization may be transferred to profiles accessible according to VID or RVID. An Aon behalf of@ authorization may include parameters, such as an expiration date, required times, required subject matter, required devices, billing services, and other variables selected by the Aon behalf of@ party. In addition to business applications, for example, a parent may given another guardian for a child authorization to place calls related to the child on behalf of the parent during a time period when the parent is not accessible.

Alternatively, a line subscriber may indicate a list of individuals authorized to place calls from that line on behalf of the line subscriber and receive calls from that line on behalf of the line subscriber, such that if one of those callers or callees is detected on the line, an Aon behalf of@ action is automatically invoked.

In addition, the Aon behalf of@ party may designate in a profile associated with the Aon behalf of@ party VID, that the Aon behalf of@ party should be contacted before a call continues on behalf of the party. Further, the Aon behalf of@ party may request a recording of any calls made on behalf of the party. The context inference service preferably accesses all relevant profiles, including that of the Aon behalf of@ party, to process Aon behalf of@ actions.

For example, in an office environment, a party, such as George Jones may enter a preference to be contacted within the office if an Aon behalf of@ action is invoked on behalf of George Jones. A page may be transmitted for George Jones, then when George Jones picks up a telephone device within the office and his identity is authenticated, the context inference service takes over to prompt George Jones for authorization of the Aon behalf of@ action. Then, the context inference service initiates recording the call placed on behalf of George Jones.

In another example, a search engine within the trusted telephone network or in a telco application server, may search for George Jones by determining a call where George Jones is currently a caller, by querying devices subscribed to by George Jones and by querying devices recently utilized by George Jones. When George Jones is located by the search engine and his identity authenticated, the context inference service then prompts George Jones for authorization of the Aon behalf of@ action.

An Aon behalf of@ action may be automatically invoked or inferred by analyzing both caller side and callee side context information. A caller profile may include an authorization to place calls on behalf of another party, when that party is included in a particular client list, where the client list may be accessed from a data server system external to the trusted telephone network. When the caller is detected and the callee is on the client list, an Aon behalf of@ action is automatically initiated for the call. However, a caller profile may only indicate that the caller is an assistant to another party. An address book or filtering preferences for that other party may be accessed when the caller is detected. If the callee is included in the other parties' address book or filtering preferences as a business contact, then it may be inferred that the caller is calling on behalf of another party.

The caller may be prompted to indicate whether the call is being made on behalf of the other party.

One advantage an Aon behalf of@ action is that the Aon behalf of@ party may be billed for charges associated with a call, rather than billing the party placing the call on behalf of the party or receiving the call on behalf of the party. Another advantage of an Aon behalf of@ action is that a party may be introduced as AJane Smith, calling on behalf of Ralph Jones@, rather than just introducing Jane Smith, who Ralph Jones's client does not recognize.

Figure 4:
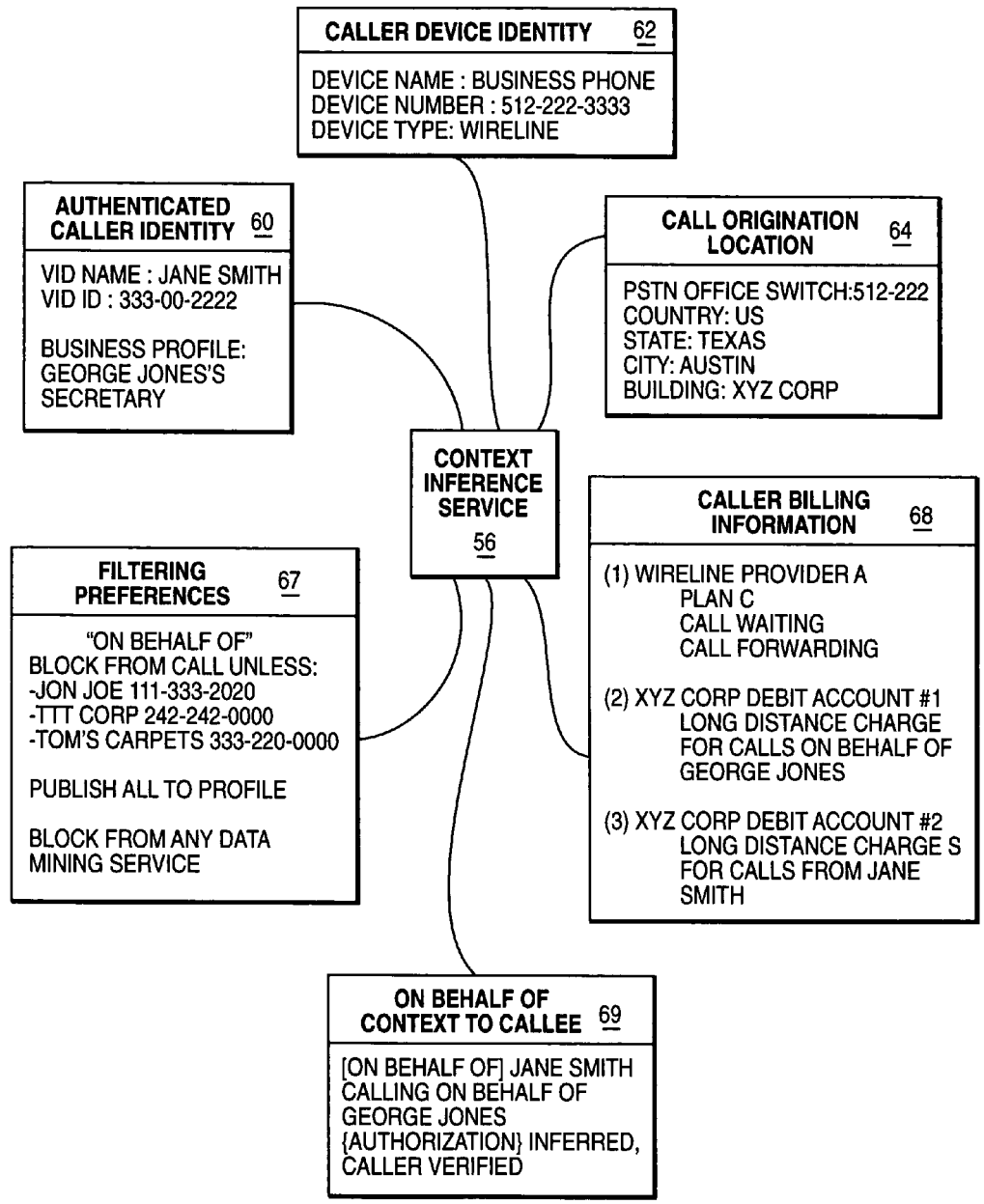
FIG. 4 illustrates an illustrative example of context information associated with a caller in accordance with the method, system, and program of the present invention.

Referring now to FIG. 4, there is depicted an illustrative example of context information associated with a caller in accordance with the method, system, and program of the present invention. As illustrated, multiple types of context information may be accessed and determined by context inference service 56. In addition to the examples depicted, in alternate embodiments, other types of context information may be accessed and determined.

In the example, a call is placed by AJane Smith@ to ATom's Carpets@. For purposes of illustration, context inference service 56 is determining the context for a call from the perspective of the caller, with reference to the identity of the callee. However, call context may also be determined from the caller and callee perspectives concurrently or independently.

First, authenticated caller identity context 60 is provided indicate who is calling. Advantageously, the name and identifier of a caller may be determined by authenticating the voice of the caller or utilizing other caller identification. In the example, a profile accessed according to the VID indicates a business profile for Jane Smith. An authenticated identity may also indicate, for example, the device utilized to perform the authentication, the frequency of identity of authentication, and the number to tries to achieve identity authentication.

Next, caller device identity context 62 is provided to indicate the device utilized to place the call. An origin device may provide device identification or the context inference service may detect and/or infer the device identity. In the example, device identity context includes the name of the device, the line number associated with the device and the type of device. The name of a device may include a specific phone within a business or home or may indicate the line subscriber of the line number. In addition, the name of the device may include a server system or private switching network identifier enabling the origin device. The device type may indicate whether a wireless or wireline connection is utilized by the device.

A call origination location context 64 is also provided to indicate the geographical location of the origination of a call. A GPS location of an origin device may be transmitted with the call or detected by an intermediary device. In addition, the context inference service may determine a general location of an origin device based on the geographical area serviced by a PSTN switching network or wireless service provider service area. In the example, the PSTN switching network office switch receiving the call is identified by the numbers serviced by that office switch. The context inference service may then lookup the office switch geographical area, which in the present example includes country, state, and city identifiers. Further, in the example, the context inference server may lookup the line number to determine the type of building, here the building is assigned to AXYZ Corp@.

In addition, caller billing information context 68 is provided to indicate the billing selections of a caller. Each caller may select multiple service providers and billing options that are accessible according to the caller VID. In the example, in addition to a wireline provider selection, debit accounts assigned to the AXYZ Corp@ are selected. The first debit account is specified for charges for calls made on behalf of AGeorge Jones@. The second debit account is specified for charges for calls made by AJane Smith@.

The context inference engine preferably requests a profile for AGeorge Jones@ in response to detecting that AJane Smith@ is his assistant. The VID for AGeorge Jones@ is preferably identified at a device, in AJane Smith's@ caller profile, or another location, such that George's profile is accessible for that VID. In this example, filtering preferences 68 for AGeorge Jones@ are accessed from George's profile.

Filtering preferences 68 indicate preferences for blocking Aon behalf of@ action publication to a caller or callee unless the caller or callee is on a list of preferred VIDs. In this example, ATom's Carpets@ is on the list of preferred VIDs and therefore the Aon behalf of@ action is not blocked from the VID transferred with the call to the callee. Filtering preferences may also indicate preferences for filtering Aon behalf of@ context published to a profile or accessed by third parties, such as a data mining service.

In addition to receiving filtering preferences from the Aon behalf of@ party, filtering preferences may be retrieved for the caller and utilized to filter Aon behalf of@ context.

Utilizing all the context information available and filtering that information according to filtering preferences 68, the context inference engine determines an Aon behalf of@ context 69. In the example, context inference engine determines that AJane Smith is calling on behalf of George Jones@. In addition, the authorization process utilized to determine the Aon behalf of@ action is indicated. In this example, the Aon behalf of@ action is inferred from Jane Smith's business profile, the billing information allowing long distances charges to George Jones' debit account, and the callee is located in George Jones' address book as a business contact. In addition, the process indicates a verification by AGeorge Jones@ that an Aon behalf of@ action is invoked.

Figure 5:
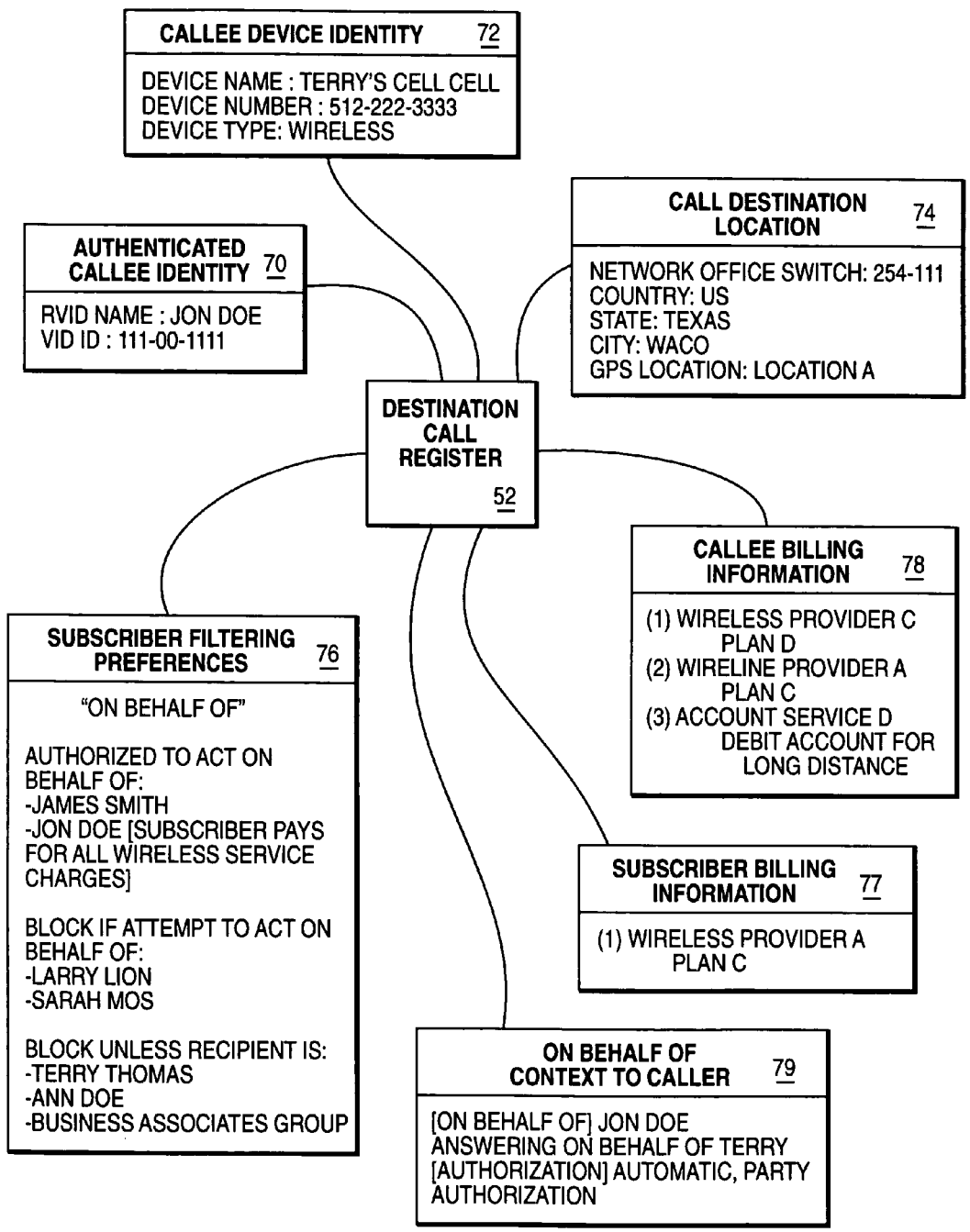
FIG. 5 depicts an illustrative example of context information associated with a callee in accordance with the method, system, and program of the present invention.

With reference now to FIG. 5, there is illustrated an illustrative example of context information associated with a callee in accordance with the method, system, and program of the present invention. As illustrated, multiple types of context information may be accessed and determined by context inference service 56. In addition to the examples depicted, in alternate embodiments, other types of context information may be accessed and determined.

In the example, a call is placed by ASally South@ to ATerry's Cell Phone@. For purposes of illustration, context inference service 56 is determining the context for a call from the perspective of the callee, with reference to the identity of the caller. However, call context may also be determined from the caller and callee perspectives concurrently.

First, authenticated callee identity context 70 is provided indicate who is receiving a call. Advantageously, the name and identifier of a callee may be determined by authenticating the voice of the callee or utilizing other callee identification. An authenticated identity may also indicate, for example, the device utilized to perform the authentication, the frequency of identity of authentication, and the number to tries to achieve identity authentication.

Next, callee device identity context 72 is provided to indicate the device utilized to receive the call. A destination device may provide device identification or the context inference service may detect and/or infer the device identity.

In the example, device identity context includes the name of the device, the line number associated with the device and the type of device. Here, the name of the device is ATerry's Cell Phone@, as inferred by the context inference service from the line subscriber profile for the device. The device is a wireless device.

A call origination location context 74 is also provided to indicate the geographical location of the origination of a call. A GPS location of an origin device may be transmitted with the call or detected by an intermediary device. In addition, the context inference service may determine a general location of an origin device based on the geographical area serviced by a PSTN switching network or wireless service provider service area. In the example, the PSTN switching network office switch receiving the call is identified by the numbers serviced by that office switch. The context inference service may then lookup the office switch geographical area, which in the present example includes country, state, and city identifiers. Further, in the example, the context inference server may lookup the line number to determine the type of building, here Alocation A@.

In addition, callee billing information context 78 is provided to indicate the billing selections of a callee. In addition, billing context may indicate the number of minutes a callee has available for the call or the amount the callee is paying per minute. By providing the caller with context for the cost of the call to the callee, the caller may, for example, offer to pay for a portion of the cost, may limit the talk time, or may access the callee through another, less expensive communication medium.

According to an advantage of the present invention, an Aon behalf of@ action may be determined by a context inference service. In the example, an on behalf of context 79 is determined, where AJon Doe is answering the call on behalf of Terry@. The context indicates that the Aon behalf of@ action was invoked automatically, according to a party authorization.

In the example, part of the line subscriber profile for the wireless device is depicted as line subscriber filtering preferences 76. The line subscriber profile may be accessed according to the wireless line number. The line subscriber may designate parties authorized to act on behalf of the line subscriber and parameters for when those selected parties may so act. Here, AJon Doe@ is included as a party that may answer calls on behalf of the line subscriber. When AJon Doe@ answers calls on behalf of the line subscriber, a parameter is set that elects for the line subscriber to pay for the wireless service charges alone. Other charges initiated by AJon Doe@ will be charged to one of the callee billing services selected in callee billing information context 78. Line subscriber billing plan information context 77 identifies the wireless provider selected by the line subscriber.

In addition, the line subscriber may designate when an Aon behalf of@ action should be blocked from transfer in the call context. In the example, the line subscriber has selected to block Aon behalf of@ context when the action is invoked by particular parties or when the call is not place or received by a particular list of VIDs. Other types of filtering may also be selected by a line subscriber.

Figure 6:
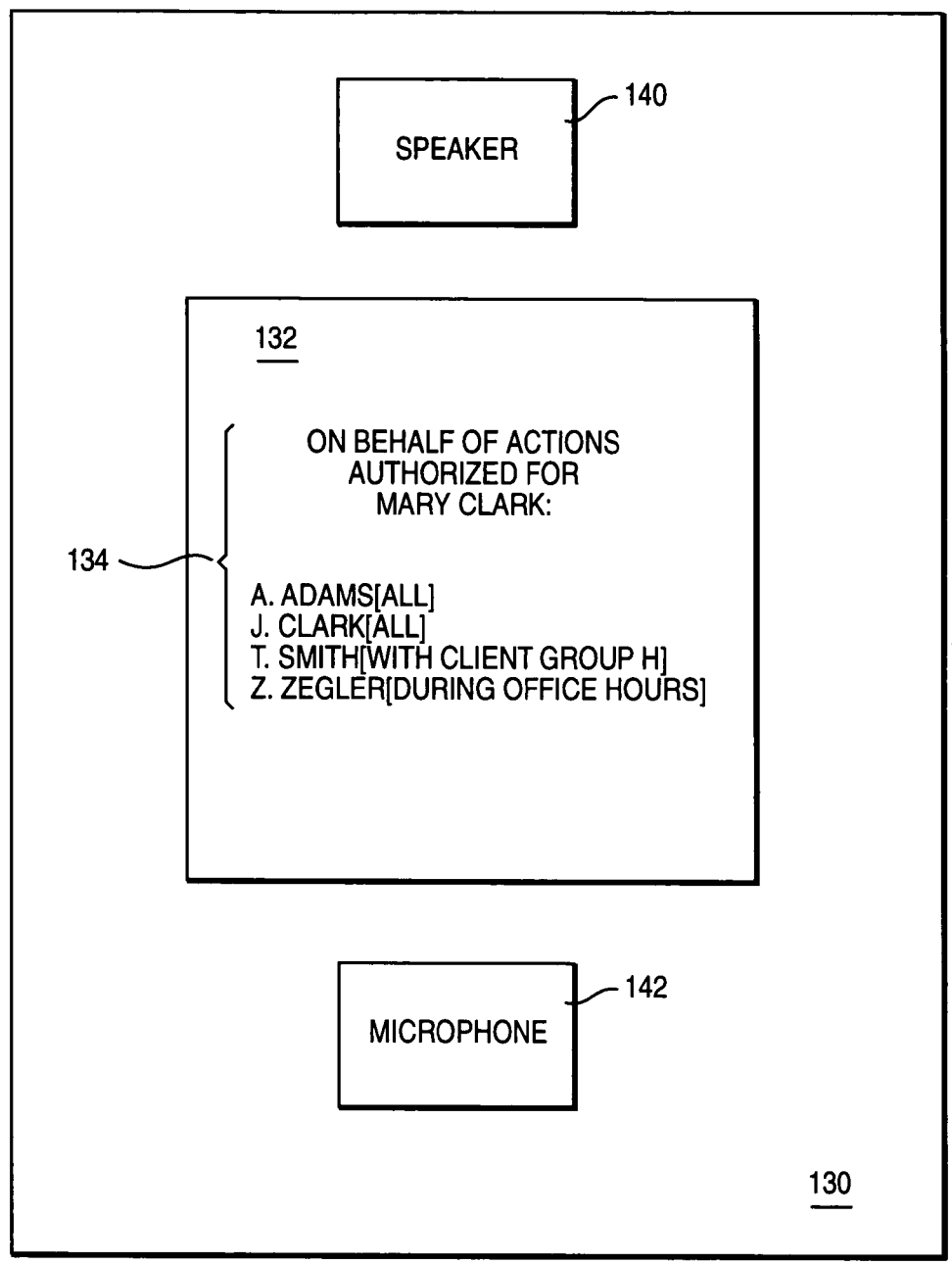
FIG. 6 illustrates an illustrative embodiment of a telephony device for invoking an Aon behalf of@ action in accordance with the method, system, and program of the present invention.

With reference now to FIG. 6, there is depicted an illustrative embodiment of a telephony device for invoking an Aon behalf of@ action in accordance with the method, system, and program of the present invention. As illustrated, telephony device 130 includes a graphical user interface 132, a speaker 140 and a microphone 142. The identity of a caller or callee currently utilizing telephony device 130 is identified. Here, the identity of a caller is identified in a VID of AMary Clark@.

In addition to authenticating the caller or callee identity, a profile for the caller or callee is preferably accessed according to caller VID and returned to telephony device 130. In the example, the caller profile preferably includes the VIDs of parties the caller is authorized to place calls on behalf of. The caller may then select one or more of the VIDs 134 by voice, keypad, or touch selection. In response to a selection of one or more of VIDs 134, a call is preferably place or answered indicating in the context that on behalf of action for the selected VIDs by the caller.

VIDs 134 may be specified according to parameters designated by those parties in designating authorization. For example, a parameter limiting authorization only where the party called or the party the call is received from are included in a preferred list of VIDs/RVIDs. In another example, a parameter may limit authorization for particular time period. Further, a parameter may allow authorization at all times, for all calls.

In the case where a private switching system controls a telephone system for an office, an assistant within the office may be authorized in a profile stored at the private switching system to act on behalf of certain members of the office. Advantageously, the assistant may utilize a telephone controlled by the private switching system to call on behalf of those certain members of the office. Display of that list of members may be advantageous, particularly where the assistant is placing or receiving a single call on behalf of multiple members.

In another case, where a babysitter or other guardian is given a limited authorization to place and receive calls on behalf of a parent, displaying that authorization as a selectable item on an telephony device utilized by the babysitter would be advantageous.

Figure 7:
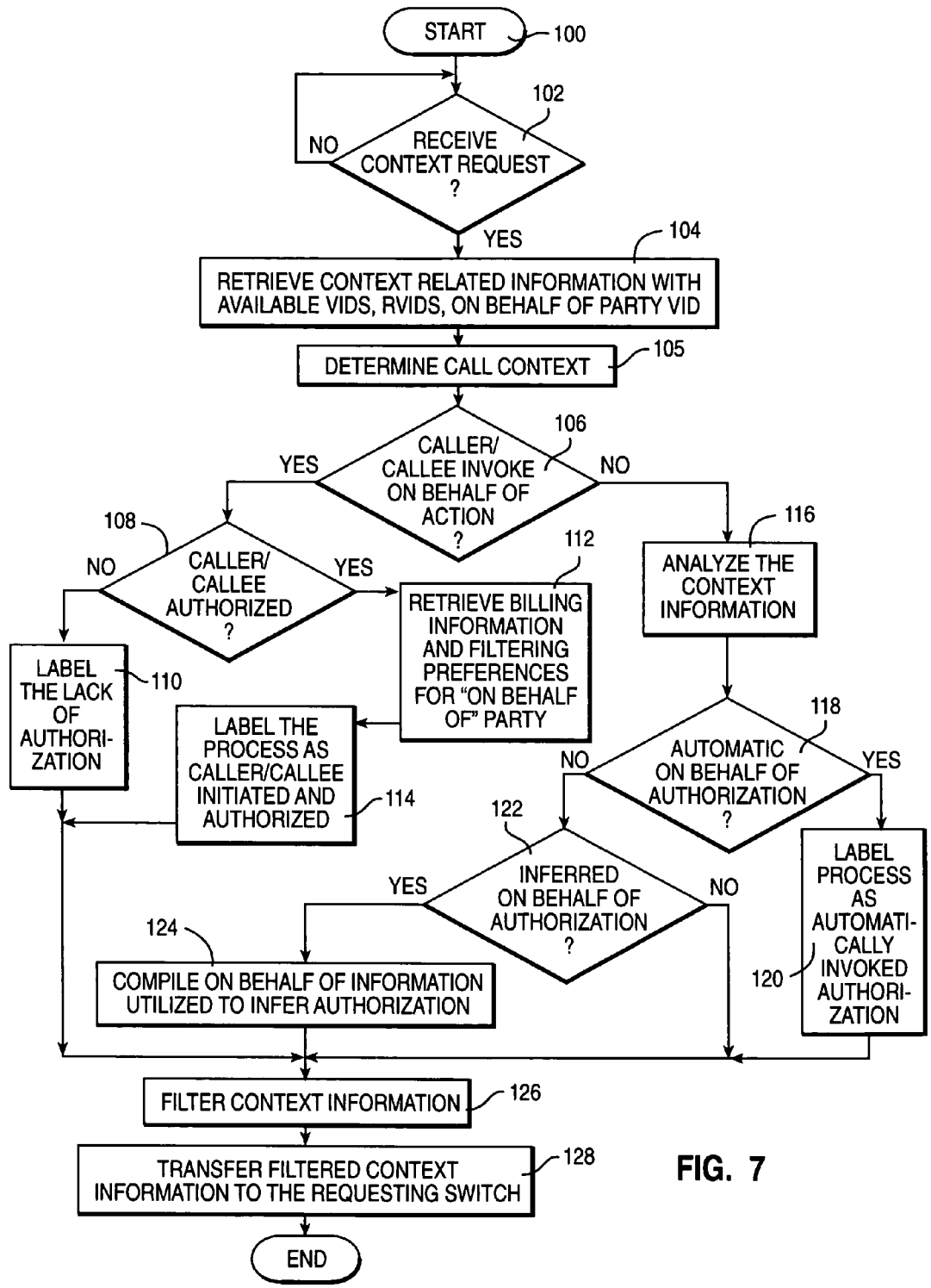
FIG. 7 depicts a high level logic flowchart of a process and program for determining on behalf of context for a call in accordance with the method, system, and program of the present invention.

With reference now to FIG. 7, there is illustrated a high level logic flowchart of a process and program for determining on behalf of context for a call in accordance with the method, system, and program of the present invention. As depicted, the process starts at block 100 and thereafter proceeds to block 102.

Block 102 illustrates a determination as to whether a request to determine context for a call is received. If a request is not received, then the process iterates at block 102. If a request is received, then the process passes to block 104.

Block 104 depicts retrieving context related information including, but not limited to, a caller VID, a callee RVID, line subscriber profiles, caller and callee profiles, and other context related information. Next, block 105 illustrates determining call context including, but not limited to, who is calling, who is receiving a call, identities of devices utilized for a call, locations of devices utilized, billing selections for a call, and subscriptions applicable for a call.

In addition, according to the present invention, an Aon behalf of@ context may be determined. Therefore, next, block 106 depicts a determination as to whether a caller/callee invokes an Aon behalf of@ action when placing or receiving a call. A caller/callee may invoke an Aon behalf of@ action by voice command, keypad command or other input. If a caller/callee does invoke an Aon behalf of@ action, then the process passes to block 108.

Block 108 illustrates a determination as to whether the caller/callee is authorized to invoke an Aon behalf of@ action. The Aon behalf of@ party may be contacted to provide authorization. Alternatively, where the Aon behalf of@ party is the line subscriber, the line subscriber may designate authorized callers/callees for Aon behalf of@ actions. Further, a caller/callee profile may include an authorization previously designated by the Aon behalf of@ party. If the caller/callee is not authorized, then the Aon behalf of@ process is labeled as caller/callee initiated, but lacking authorization, as illustrated at block 110, and the process passes to block 126. If the caller/callee is authorized, then billing information for the Aon behalf of@ party is retrieved, as depicted at block 112. Next, block 114 illustrates the Aon behalf of@ process is labeled as caller/callee initiated with authorization.

Returning to block 106, if a caller/callee does not invoke an Aon behalf of@ action, then the process passes to block 116. Block 116 depicts analyzing the context information for any Aon behalf of@ action. Next, block 118 illustrates a determination as to whether an Aon behalf of@ action is automatically invoked. If an Aon behalf of@ action is automatically invoked, then the process passes to block 120. An Aon behalf of@ action may be automatically invoked, for example, by an Aon behalf of@ setting in a caller/callee profile. Block 120 depicts labeling the process as automatically invoked with authorization, and the process passes to block 126.

Returning to block 118 if an Aon behalf of@ action is not automatically invoked, then the process passes to block 122. Block 122 illustrates a determination as to whether an Aon behalf of@ action is inferred by the call context. An Aon behalf of@ action may be inferred from the call context, for example, where the billing information for a caller includes another party's billing service for long distance service charges made on behalf of that party. If an Aon behalf of@ action is inferred by the call context, then the Aon behalf of@ process is labeled as inferred, as illustrated at block 124. The Aon behalf of@ party may also be given an opportunity to authorize the action. If an Aon behalf of@ action is not inferred, then the process passes to block 126.

Block 126 illustrates filtering the context information for a call. In particular, context information may be filtered according to a switch request, a caller or callee profile request, or other filtering parameters. In addition, multiple filtered context packets may be determined, where each packet is filtered for a different party according to parameters designated for that party.

Next, block 128 depicts transferring the filtered context information to the requesting switch, and the process ends. In addition, filtered context information may be transferred according to VID/RVID for storage.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A system for determining a call context, comprising:
   a context inference server communicatively connected to a telephone network;
   means for receiving, by a context inference service, a call context request for a call at said context inference server;
   means for analyzing, by a context inference service, call context information associated with at least one from among a caller and a callee associated with said call; and
   means for inferring, by a context inference service, that an on behalf of action is invoked for said call from call context information.

2. A system for identifying parties to a call comprising:
   a context inference server communicatively connected to a telephone network;
   means for detecting a call between at least two parties, wherein said call is processed by said telephone network;
   means for detecting, by a context inference service running on a context inference server, an on behalf of action invoked for said call; and
   means for informing at least one party to said call that said on behalf of action is invoked.

3. A system for determining a call context, comprising:
   a context inference server communicatively connected to a telephone network;
   means for receiving, by a context inference service running on a context inference server, a call context request for a call at said context inference server;
   means for analyzing, by a context inference service running on a context inference server, call context information associated with said call; and
   means for determining, by a context inference service running on a context inference server, whether an on behalf of action is invoked for said call from said call context information.

4. The system for determining a call context according to claim 3, wherein said call context information comprises at least one from among, identifiers for said at least two parties, profiles associated with said at least two parties, and profiles associated with subscribers of line numbers associated with said call.

5. The system for determining a call context according to claim 3, wherein said means for determining whether an on behalf action is invoked further comprises:
   means for detecting a request for said on behalf action by at least one party to said call.

6. The system for determining a call context according to claim 3, wherein said means for determining whether an on behalf action is invoked further comprises:
   means for detecting an automatic authorization for said on behalf of action by an on behalf party to said call.

7. The system for determining a call context according to claim 3, wherein said means for determining whether an on behalf action is invoked further comprises:
   means for inferring said on behalf action from said call context information.

8. The system for determining a call context according to claim 3, further comprising:
   means for contacting an on behalf of party for authorization of said on behalf of action.

9. The system for determining a call context according to claim 8, further comprising:
   means for paging said on behalf of party within a paging radius of a private network system; and
   means responsive to detecting an identifier for said on behalf ofparty at a telephony device within a private network system, for requesting authorization of said on behalf of action at said telephony device.

10. The system for determining a call context according to claim 8, further comprising:
    means for querying at least one line number for said on behalf of party; and
    means responsive to locating said on behalf of party via a particular line number, for requesting authorization of said on behalf of action via said particular line number.

11. The system for determining a call context according to claim 3, further comprising:
    means for accessing on behalf of filtering preferences; and
    means for filtering said on behalf of action in said call context according to said filtering preferences.

12. The system for determining a call context according to claim 11, wherein said on behalf of filtering preferences are accessed for an on behalf of party.

13. The system for determining a call context according to claim 11, wherein said on behalf of filtering preferences are accessed for a party invoking said on behalf of action.

14. The system for determining a call context according to claim 11, wherein said filtering preferences specify parties enabled to invoke said on behalf of action for said call.

15. The system for determining a call context according to claim 11, wherein said filtering preferences specify parties enabled to receive said call context.

16. The system for determining a call context according to claim 11, wherein said filtering preferences specify parties blocked from invoking said on behalf of action for said call.

17. A method for identifying a call context for a call on behalf of another, said method comprising:
    receiving, by a context inference service running on a context inference server, a request for a call context for a call;
    receiving, by the context inference service, call context information associated with at least one from among a caller and a callee associated with said call;
    analyzing, by the context inference service, the call context information;
    inferring, by the context inference service in dependence upon the call context information, the identity of at least one party to the call and a subject matter surrounding the call;
    inferring, by the context inference service in dependence upon the identity of at least one party to the call and the subject matter surrounding the call, that an on behalf of action is invoked for said call; and
    sending, from the context inference service, a call context for the call including an indication that an on behalf of action is invoked for said call.

* * * * *